(12) United States Patent
McDonald

(10) Patent No.: US 10,456,812 B2
(45) Date of Patent: *Oct. 29, 2019

(54) APPARATUS AND METHOD FOR WASHING MEAT AND/OR PRODUCE

(71) Applicant: Tim McDonald, Missouri City, TX (US)

(72) Inventor: Tim McDonald, Missouri City, TX (US)

(*) Notice: Subject to any disclaimer, the term of this patent is extended or adjusted under 35 U.S.C. 154(b) by 928 days.

This patent is subject to a terminal disclaimer.

(21) Appl. No.: 14/877,519

(22) Filed: Oct. 7, 2015

(65) Prior Publication Data

US 2016/0144412 A1    May 26, 2016

Related U.S. Application Data

(63) Continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(51) Int. Cl.
| | |
|---|---|
| *A22C 17/00* | (2006.01) |
| *B08B 3/04* | (2006.01) |
| *A22C 17/08* | (2006.01) |
| *A23N 12/02* | (2006.01) |
| *A22C 21/00* | (2006.01) |
| *A22C 25/02* | (2006.01) |
| *B08B 3/10* | (2006.01) |

(52) U.S. Cl.
CPC .............. *B08B 3/048* (2013.01); *A22C 17/08* (2013.01); *A22C 21/0061* (2013.01); *A22C 25/02* (2013.01); *A23N 12/02* (2013.01); *B08B 3/102* (2013.01)

(58) Field of Classification Search
CPC ........... B08B 3/048; B08B 3/04; A22C 17/00; A22C 17/08
USPC ........................................................ 452/173
See application file for complete search history.

(56) References Cited

U.S. PATENT DOCUMENTS

| | | |
|---|---|---|
| 1,964,430 A | 6/1934 | Eberts |
| 2,286,393 A | 6/1942 | Thomas |
| 2,308,775 A | 1/1943 | Olson |
| 2,504,946 A | 4/1950 | Doolittle |
| 2,578,808 A | 12/1951 | Johnson et al. |
| 2,860,371 A | 11/1958 | Krull |
| 2,920,606 A * | 1/1960 | Anderson .............. A01K 61/59 119/206 |
| 2,966,159 A | 12/1960 | Ruegnitz |

(Continued)

*Primary Examiner* — Richard T Price, Jr.
(74) *Attorney, Agent, or Firm* — Egbert Law Offices, PLLC

(57) ABSTRACT

An apparatus for washing meat or produce includes a container having an interior volume defined by wall and a base, and a pipe having an outlet opening to the interior volume of the container and an inlet at an exterior of the container. The container has an opening at an upper end thereof. The outlet opens adjacent to the base such that a flow of the fluid through the pipe is directed toward or adjacent to the base. The flow of water is directed through the container so as to create a circular flow pattern that causes the debris separate from the meat or produce within the container. A handle is affixed to or formed with the container on one of the end walls of the container.

9 Claims, 6 Drawing Sheets

(56) References Cited

U.S. PATENT DOCUMENTS

| | | | |
|---|---|---|---|
| 3,189,927 A | | 6/1965 | Dyar |
| 3,902,457 A | * | 9/1975 | Musgrove ................ B07C 5/12 |
| | | | 119/218 |
| 4,101,607 A | * | 7/1978 | Bart .................... B01F 3/04099 |
| | | | 119/263 |
| 4,173,051 A | | 11/1979 | Reid |
| 4,621,573 A | | 11/1986 | Lange |
| 4,726,095 A | | 2/1988 | Bissell, Jr. et al. |
| 4,763,386 A | | 8/1988 | Wissbroecker |
| 4,876,768 A | | 10/1989 | Bright |
| 5,129,855 A | | 7/1992 | Bruckert et al. |
| 5,220,880 A | * | 6/1993 | Alworth ................ A01K 63/02 |
| | | | 119/203 |
| 5,253,610 A | * | 10/1993 | Sharber ................ A01K 79/02 |
| | | | 119/200 |
| 5,730,086 A | * | 3/1998 | Truebe .................. A01K 79/02 |
| | | | 119/219 |
| 6,067,937 A | * | 5/2000 | Boschert ............. A01K 63/003 |
| | | | 119/247 |
| 6,161,504 A | * | 12/2000 | Jungling ................ A01K 79/00 |
| | | | 119/215 |
| 8,950,361 B1 | * | 2/2015 | Pierce .................. A01K 63/042 |
| | | | 119/200 |
| 2011/0220158 A1 | | 9/2011 | Ho |
| 2012/0312243 A1 | * | 12/2012 | Rusch .................. A01K 29/005 |
| | | | 119/204 |
| 2013/0093107 A1 | | 4/2013 | Funderburg |
| 2014/0127986 A1 | | 5/2014 | Cady |

* cited by examiner

APPARATUS AND METHOD FOR WASHING MEAT AND/OR PRODUCE

CROSS-REFERENCE TO RELATED APPLICATIONS

The present application is a continuation-in-part of U.S. patent application Ser. No. 14/812,545, filed on Jul. 29, 2015 and entitled "Apparatus and Method for cleaning Produce". Application Ser. No. 14/812,545 issued as U.S. Pat. No. 9,408,412 on Aug. 9, 2016. U.S. patent application Ser. No. 14/812,545 was a continuation-in-part of U.S. patent applicant Ser. No. 14/550,195, filed on Nov. 21, 2014, and entitled "Apparatus and Method for Cleaning Game". Application Ser. No. 14/550,195 issued as U.S. Pat. No. 9,320,286 on Apr. 26, 2016.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus and methods for washing meat and/or produce. More particularly, the present invention relates to apparatus for separating debris from the meat and from the produce. More particularly, the present invention relates to methods and apparatus whereby meat, game and/or produce can be easily washed in a relatively small container.

2. Description of Related Art Including Information Disclosed Under 37 CFR 1.97 and 37 CFR 1.98

During the course of hunting, it becomes necessary to harvest the meat from the killed game. The game can be in the nature of birds, fish, deer, boars, and other commonly-hunted game. When the meat is harvested, the harvested meat is often tossed into a container, along with the associated debris, such as feathers, hair, blood, scales, and related debris. After the meat is collected in the container, the meat must be meticulously cleaned in order to separate the debris from the meat. This is a very time-consuming and difficult operation. As such, a need has developed so as to provide an apparatus and method so as conveniently and efficiently separate the debris from the meat.

In particular, in the hunting of fowl, the bird is de-breasted so that the breast meat can be tossed into the container. The person harvesting the meat will often have feathers and blood on his or her hands. Whenever the harvested breast is tossed into the container, the feathers and blood will also be passed into the container. After all of the breasts, blood and feathers have been accumulated in the container, another operation is required to take each of the breasts from the container and meticulously clean the breast of blood and feathers. As a result, a clean bird breast is obtained.

In the case in which fish are the game that is being caught, the fillets of the fish are separated from the body of the fish and also tossed into the container. During the process of descaling the fish, residual scales and blood will reside on the hands of the person cleaning the fish. The scales and blood will be delivered, along with the harvested meat, into the container. Once again, a need has developed so as to be able to properly separate the meat of the fish from the scales and the blood.

In the past, various patents have issued relating to devices for cleaning game. For example, U.S. Pat. No. 2,860,371, issued on Nov. 18, 1958 to R. M. Krull, describes a fish cleaning device. This fish cleaning device includes a generally cylindrical housing. The housing has a plurality of longitudinal corrugations therein spaced around an upper compartment. An electric motor is mounted in the lower compartment and has a vertical shaft extending through the wall into the upper compartment. A scaling plate is mounted on the shaft in rotatable relationship therewith adjacent the wall in the upper compartment. The plate has a plurality of angularly spaced upwardly projecting generally radial ridges thereon so as to cause tumbling action in fish contained in the upper compartment.

U.S. Pat. No. 2,966,159, issued on Dec. 27, 1960 to R. C. Ruegnitz, describes an egg washing apparatus. This egg washing apparatus includes a container having an imperforate detachable cover and includes a chamber adapted to receive a liquid. A perforate basket supports eggs within the container and has a sleeve extending centrally therein above a horizontal plane defined by the upper rim of the basket. The basket is removably suspended within the chamber. An agitator is provided that includes a vertical shaft equipped with a plurality of elongated vertical blades. A motor is arranged with the agitator for rotating the agitator.

U.S. Pat. No. 4,173,051, issued on Nov. 6, 1979 to J. P. Reid, describes a vegetable washer for washing food articles. The washing apparatus includes a container for housing the food articles, an agitation system and washing system for removing undesired foreign materials from the surface of the food articles, and a discharge system.

U.S. Pat. No. 4,726,095, issued on Feb. 23, 1988 to Bissell Jr. et al., discloses a fish scaler device. The device includes a water bucket, an abrasive continuous surface within the bucket, and an agitator for water within the bucket. As the water is agitated, fish suspended within the bucket gently tumble against the abrasive surface and are thereby scaled. The abrasive surface is an inwardly dimpled bucket liner. The agitator is a rotatable impeller.

U.S. Pat. No. 4,763,386, issued on Aug. 16, 1988 the H. A. Wissbroecker, teaches a fish scaling apparatus that includes a container and a cylindrical insert including a plurality of inwardly-extending projections. The projections are provided with a rough or sharp edge. A paddle member is disposed within the interior of the cylindrical insert and is connected to a shaft extending exterior of the container. The shaft is adapted for connection to the chuck of a portable drill. When the drill is operated, the rotation of the paddle member occurs within the interior of the cylindrical insert. The rotation causes fish disposed within the interior of the cylindrical insert to come into contact with the inwardly-extending projections so as to remove the scales from the fish.

U.S. Pat. No. 4,876,768, issued on Oct. 31, 1989 the C. K. Bright, shows a fish scaler that includes a bucket. A perpendicularly extending rod is rotatably connected to the lid of the bucket. A scaling element is attached to the rod. A plurality of scaling protrusions are attached to the exterior of the scaling element. The rotation of the scaling element causes relative movement between the scaling protrusions and the suspended fish so as to remove the scales from the suspended fish.

U.S. Pat. No. 5,129,855, issued on Jul. 14, 1992 to Bruckert et al., describes a fish scaler apparatus that includes an exterior cylindrical container with an interior cylindrical insert. A central axle is directed through a lid of the container so as to accommodate a drill so as to permit the rotation of the axle. The axle includes a central conduit with exterior ports to effect the washing of the fish within the container. The ports are in fluid communication with a fluid source, such as a garden hose.

U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in to mix with water. This causes the meat float up from the bottom and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described having a conduit affixed to a wall thereof. The conduit can be connected to a source of water pressure such that water pressure is directed into the interior of the bucket so as to interact with the game within the interior of the bucket.

Produce is a generalized term for a group of farm- or garden-produced crops and goods including fruits and vegetables. Nuts, grains, oats and tubers are also considered to be produce. The term "produce" implies that the products are fresh and generally in the same state as when they were harvested.

Whenever produce is removed from the garden or farm, the produce often has debris from the earth attached thereto. For example, when potatoes are harvested, the potatoes will have a substantial amount of dirt thereon. When berries or other fruits are harvested, they often have number of stems and residual leaves attached thereto. In other circumstances, when such produce is a product of farming, the produce can often have certain amounts of pesticides and fungicides thereon. As such, whenever the produce is harvested, it is important to be able to scrub and clean the produce before the produce is consumed by individuals or processed further.

The cleaning of produce is a rather time-consuming, labor-intensive, and difficult process. For mass-produced vegetables and fruits, a wide variety of cleaning machines have been developed. These cleaning machines are very complicated and quite expensive. Typically, the machines will include a variety of scrubbing brushes which tend to scrape the exterior of the produce. This can actually result in damage to the produce. In other circumstances, jets of water can be directed to the produce. However, the jets of water often only contact a portion of the surface of the produce and do not effectively scrub the entire fruit or vegetable. In other circumstances, where large numbers of fruits and vegetables are being cleaned, the grouping of such fruits and vegetables will actually impair the ability to effectively clean certain surfaces of the fruit or vegetable.

For garden-produced produce, individuals will often require the use of scrub brushes or other cleaning implements in order to effectively remove the debris from the exterior of the produce. This will make the cleaning of the produce a difficult and time-consuming process. Eventually, users may grow uninterested in the complete cleaning of such produce and, as a result, will be content to leave some of the debris on the produce. Whenever debris remains on the produce, this can impair the taste of the fruit or vegetable, or result in toxic effects to the person consuming the produce. As such, it is very important to effectively clean produce in a quick, easy, and non-labor-intensive manner.

In the past, various patents have issued relating to the cleaning of fruits and vegetables. For example, an early patent is that of U.S. Pat. No. 1,964,430, issued on Jun. 26, 1934 to E. C. Eberts. This patent describes a fruit and vegetable cleaning machine that includes a mass of freely-moving sponges. A rotary screening member is rotated to agitate the mixed mass of fruits and vegetables so as to cause such fruit and vegetables to percolate through the mass of sponges. A liquid is provided to contact with the sponges. Another means is provided for separating the product from the sponges.

U.S. Pat. No. 2,286,393, issued on Jun. 16, 1942 to J. Thomas, discloses a vegetable cleaner in which a series of brush rolls are mounted in parallel relation to form a brushing bed over which the vegetables can be advanced transversely of the rolls. The rolls are driven in a common direction corresponding to the direction of advance of the vegetables. A terminal roll is driven in a direction of rotation opposite to the other rolls in order to arrest the advance of the vegetables. The spacing of the terminal roll in the oppositely-rotating adjacent roll is such that the vegetables resting on the terminal roll and the oppositely-rotating roll are discharged outwardly therebetween and in brushing engagement therewith.

U.S. Pat. No. 2,308,775, issued on Jan. 19, 1943 to S. Olson, teaches a vegetable cleaning machine. This vegetable cleaning machine includes a drum that is open at opposite ends thereof. The drum is supported for rotation about an inclined axis. Rotary brushes are mounted inside the drum in substantially contiguous relationship to each other and with their axes extending parallel to the axis of the drum. The brushes are rotated in the same direction by the rotation of the drum about its axis.

U.S. Pat. No. 2,504,946, issued on Apr. 18, 1950 to J. C. Doolittle, shows a vegetable cleaning machine. In particular, this machine is designed for cleaning podded vegetables. The machine includes a plurality of driven conveyor belts arranged one below the other so that a lower belt will receive the vegetables dropped thereupon from the discharge end of an upper belt so as to form repeated cleaning stations. A current of air is directed over and adjacent to the surface of the lower belts and in a direction opposite to the direction of travel of the conveying surfaces in order to blow stalks, leaves, and other trash from the potted vegetables as they dropped from one belt to another and while they are being conveyed on and by the belts.

U.S. Pat. No. 2,578,808, issued on Dec. 18, 1951 to Johnson et al., teaches a potato cleaning and separating device. This device employs a first chamber containing a brine solution of a sufficient specific gravity to cause the heavier pieces of debris to precipitate to the bottom of the debris while the potatoes float on the surface of the brine solution. A second chamber contains only water wherein the potatoes are washed and separated from the remaining debris.

U.S. Pat. No. 3,189,927, issued on Jun. 22, 1965 to R. L. Dyar, shows a vegetable processing machine including an elongated drum and a means for rotating the drum. The drum rotates about an axis such that a mass of material within the drum moves by gravity to a lower wall of the drum. Elongated brushes are positioned within the drum at a location adjacent to the interior wall of the drum. The brush is rotated in a direction such that the bristles of the brush closest to the inner wall of the drum move in an opposite direction to the movement of the wall of the drum. Material within the drum is conveyed toward the brush during rotation of the drum and is progressively contacted by the drum and expelled toward the rear of the moving mass of material.

U.S. Pat. No. 4,621,573, issued on Nov. 11, 1986 to F. Lange, discloses an apparatus for cleaning fruits and vegetables. This apparatus is provided for removing damaged, skin impurities. This cleaning apparatus has a loading opening, and a housing enclosing a revolving conveyor drum which is partially surrounded by a plurality of abrasive elements. The abrasive elements serve to clean the fruits and vegetables within the housing.

U.S. Patent Application Publication No. 2011/0220158, published on Sep. 15, 2011 to C. T. Ho, provides a fruit and vegetable cleaning device that includes a base, a pump and a pressure vessel. The pump is mounted on the base and includes a water feeding pipe connecting a water inlet port and the pressure vessel. The pressure vessel includes a water discharge port and an electromagnetic valve. The pump supplies water to the pressure vessel to allow air to mix with the water inside the pressure vessel so as to fill the water with air bubbles. Residual pesticides remaining on fruits and vegetables will attach to the tiny air bubbles contained in the water when the water is used to clean the fruits and vegetables.

Additionally, certain patents have issued with respect to the washing of game. U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in order to mix with the water. This causes the meat the float up from the bottom and the and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described as having a conduit affixed to a wall thereof. The conduit can be connected to a source of water pressure such that the water pressure is directed into the interior of the bucket so as to interact with the game within the interior of the bucket.

It is an object of the present invention provide a method and apparatus that effectively washes meat and/or produce.

It is another object of the present invention to provide a method and apparatus that is relatively inexpensive.

It is another object of the present invention to provide a method and apparatus wherein the container used for the washing of meat and/or produce can be blow-molded and/or injection molded.

It is another object of the present invention to provide a method and apparatus that washes meat and/or produce more efficiently.

It is another object of the present invention to provide a method and apparatus for washing meat and/or produce that can be easily handled, transported and stored.

It is still another object of the present invention to provide a method and apparatus for washing meat and/or produce that facilitates the ability to carry the unwashed meat or produce.

It is still another object of the present invention provide a method and apparatus for washing meat and/or produce that is has a size suitable for placement in an ice chest.

It is still a further object of the present invention to provide a method and apparatus for washing meat and/or produce that allows the washed meat and/or produce to be easily removed from the container.

These and other objects and advantages of the present invention will become apparent from a reading of the attached specification and appended claims.

BRIEF SUMMARY OF THE INVENTION

The present invention is an apparatus for washing meat or produce that comprises a container having an interior volume defined by a wall and a base, and a pipe having an outlet opening to the interior volume of the container. The pipe has an inlet at an exterior of the container. The pipe has an outlet opening adjacent to the base such that flow of the fluid through the pipe is directed toward or adjacent to the base. The container has an opening at an upper end thereof.

The container includes a pair of side walls and a pair of end walls extending upwardly from the base so as to define the interior volume. A handle may be affixed to or formed with the container on one of the end walls. One of the end walls has a first portion extending upwardly and in transverse relation to the base and a second portion extending upwardly and inwardly from an upper end of the first portion. The second portion extends upwardly toward the opening of the container. The handle includes an interior passageway opening at one end adjacent to the opening of the container and opening at an opposite end to the interior volume of the container at a level above the pipe. Within the concept of the present invention, the container can be formed without a handle. In particular, a pair of grinding indentations can be formed on the pair of side walls instead of the handle.

In the present invention, a lid can be removably affixed over the opening at the upper end of the container.

The pipe extends through a hole formed in one of the end walls and in a location spaced above the base of the container. The outlet of the pipe is positioned in the interior volume of the container in spaced relation to the end wall. The inlet of the pipe extends outwardly of the container and in spaced relation to the end wall. The outlet of the pipe has a cover thereover. This cover has an aperture configured so as to direct the flow of water toward or adjacent to the base of the container. This aperture can be in the nature of a nozzle. In particular, in the preferred embodiment, the cover has a circular shape. The aperture is defined by a chord extending across the circular shape. The inlet of the pipe has a hose connection therein. The hose connection is adapted to connect with a fluid-delivering hose. The pipe can alternatively have walls that converge toward the outlet so as to direct the flow of water toward or adjacent to the base.

The present invention is also a method of washing debris from meat or produce. This method includes the steps of: (1) placing the meat or produce into a container such that the meat or produce resides at a bottom of the container; (2) introducing water into the container such that the water flows in a direction adjacent to the bottom of the container and flows upwardly and then downwardly in a circular flow pattern within the interior volume of the container; (3) continually flowing water into the container such that the circular flow pattern causes the debris to separate from the meat or produce in the container; and (4) overflowing the water outwardly over an upper edge of an opening at an upper end of the container such that the debris is carried out of the interior volume of the container and over the upper edge.

The container is formed having a pair of sidewalls and a pair of end walls extending upwardly from the bottom. The method can also include forming a handle on or with the container such that the handle has an interior passageway opening at one end the handle adjacent the opening at the upper end of the container and opening at another end above the bottom of the container. The step of continually flowing include circulating the water in the container such that the water flows through the interior passageway of the handle from one end of the handle toward an opposite end of the handle such that the flow of water is discharged from the upper end of the handle into the interior volume of the container.

The method of the present invention further includes affixing a hose to a hose connection on the container and discharging water under pressure through the hose and into the interior volume of the container. The water from the container can be emptied such that the washed meat or produce will ultimately reside at the bottom of the container.

This foregoing Section is intended to describe, with particularity, the preferred embodiment of the present invention. It is understood that modifications to this preferred embodiment can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
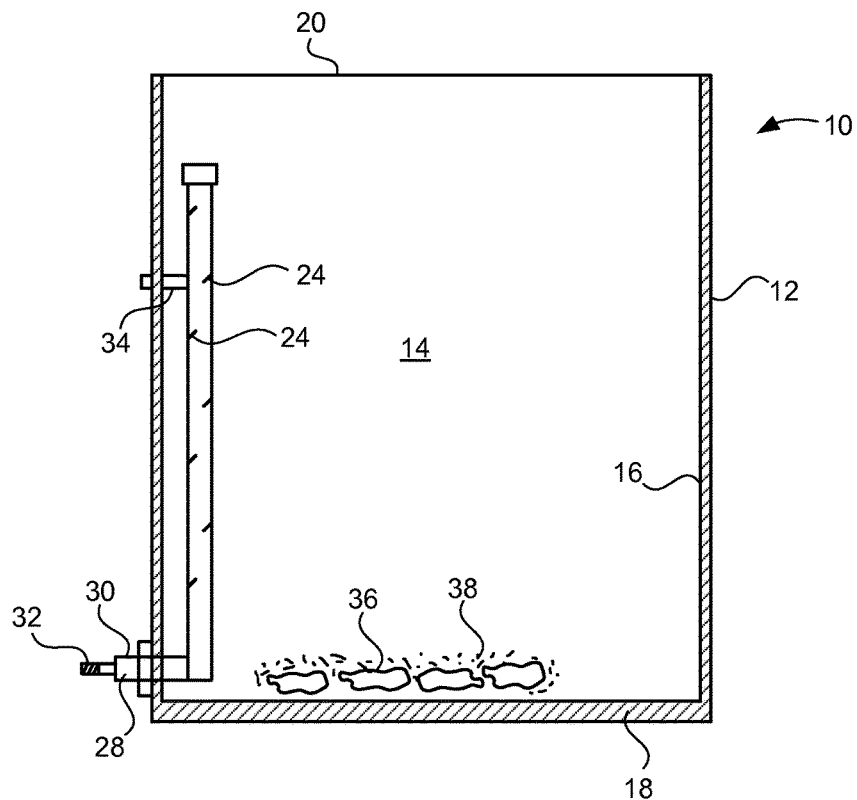
FIG. 1 is a cross-sectional side view showing an early form of the apparatus of the present invention.

Referring to FIG. 1, there is shown apparatus 10 for the washing of meat and/or produce. As used herein, the term "game" can include fowl, fish, and other wildlife and shellfish. The apparatus 10 includes a container 12 having an interior volume 14. The interior volume 14 is defined by an inner wall 16. The container 12 also includes a base 18 and an upper edge 20. A pipe 22 is positioned in the container 12 adjacent to the inner wall 16. The pipe 22 has at least one aperture 24 suitable for directing a flow of water toward a portion of the wall 16 spaced from the pipe 22 such that the flow of water creates a cyclonic path of the water in the container 12.

In FIG. 1, the pipe 22 extends generally vertically along the inner wall 16 the container. The pipe 24 has a closure 26 at the upper end thereof. As such, all of the water that enters the interior of the pipe 22 will be directed outwardly of the pipe 22 through the apertures 24. A connector 28 is fluidically connected to the pipe 22 adjacent a lower end of the pipe 22. The connector 26 has a portion 30 that extends outwardly of the container 12. The connector 28 also has a water hose connector 32 thereon such that the pipe 22 can be connected to a water hose. Suitable fittings can be associated with the connector 28 so as to establish a liquid-tight seal for the connector through the wall of the container 12. A fastener 34, such as a bolt or a screw, is affixed to the pipe 22 and is affixed to the container 12 so as to fixedly position the pipe 22 adjacent the inner wall 16 of the container 12. Within the concept of the present invention, more than one pipe could be utilized.

As can be seen in FIG. 1, the meat or produce 36 and the debris 38 has been introduced through the opening at the upper edge 20 of the container 12. The meat or produce 36 and the debris 38 will initially reside at the base 18 of the container 12. In normal use, for example, as a bird is de-breasted, the breast meat, along with associated loose feathers and blood will be dropped through the opening at the upper edge 20 of the container 12 so as to reside at the base 18. In this manner, the meat, feathers and blood of the bird can be accumulated within the container 12. Prior to the present invention, a later process would be required so as to wash the meat 36 so as to effectively remove the loose feathers and blood from the meat 36. This process would be very time-consuming and labor intense. As such, the present invention was developed so as to allow for the washing of the meat 36 and the separation of the debris 38 from the meat 36 in a rapid and efficient manner.

Figure 2:
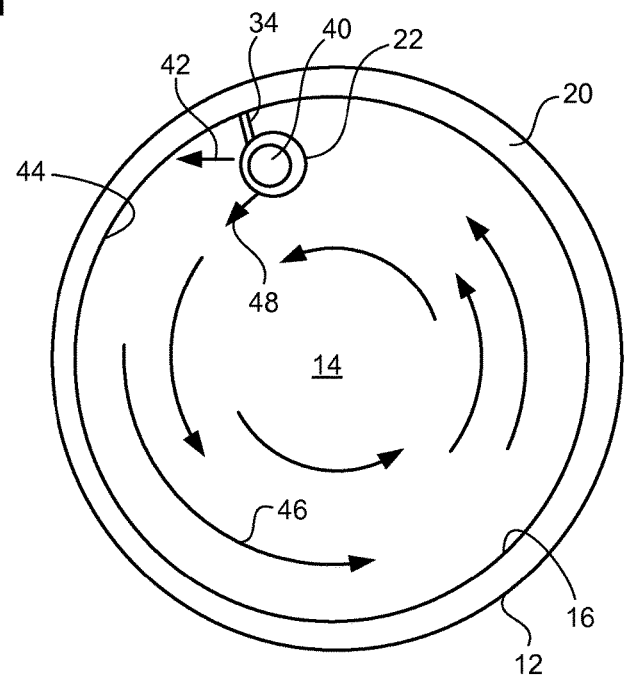
FIG. 2 is a cross-sectional plan view showing an early form of the apparatus of the present invention.

FIG. 2 illustrates a plan view of the container 12 and showing the upper edge 20 of the container. The container 12 has an inner wall 16 that defines the interior volume 14 of the container. In FIG. 2, it can be seen that the pipe 22 is affixed by fastener 34 to the inner wall 16 of the container 12.

Importantly, in FIG. 2, it can be seen that the water is directed from the interior 40 of the pipe 20 outwardly through the apertures 24. As such, the water will flow outwardly of the pipe 22 in a first direction through a first set of apertures and will be directed in a second direction from a second set of apertures. The water flow 42 is directed toward a portion 44 of the inner wall 16 of the container in spaced relationship to the pipe 22. The water flow 43 is directed from the second set of apertures outwardly of the pipe 22 also toward another portion of the inner wall 16 of the container 12. In particular, the water flow 42 is directed to the portion of the wall 16 of the container 12 generally adjacent to the pipe 22. The water flow 43 is directed toward a portion of the wall 16 in a location spaced further from the pipe 22 and spaced from the portion of the wall associated with the water flow 42. The direction 42 is generally a chord of a circumference of the container 12. By flowing the water in the first direction, a cyclonic path of water flow (illustrated by arrows 46) is created in the interior 14 of the container 12. The cyclonic path of water flow 42 serves to effectively separate the debris 38 from the meat or produce 36. The first set of apertures 24 of the pipe 22 will distribute the jets of water over a substantial portion of the height of the container 12. This has been found to enhance the strength of the cyclonic flow path into create an improved washing effect. The water flow 43 from the second set of apertures of the pipe 22 provides a broader flow which serves to agitate the water within the container 12 further and to pressure wash the meat or produce within the container. As such, the combined water flows 42 and 43 serve to substantially increase the turbulence within the container for the purpose of separating the debris from the meat or produce. The water flow 42 creates the cyclonic flow path while the water flow 43 agitates the water flows and pressure washes the meat or produce simultaneously. As such, these water flows 42 and 43 combine to enhance the ability of the present invention to effectively clean the meat or produce and remove debris from the meat.

Figure 3:
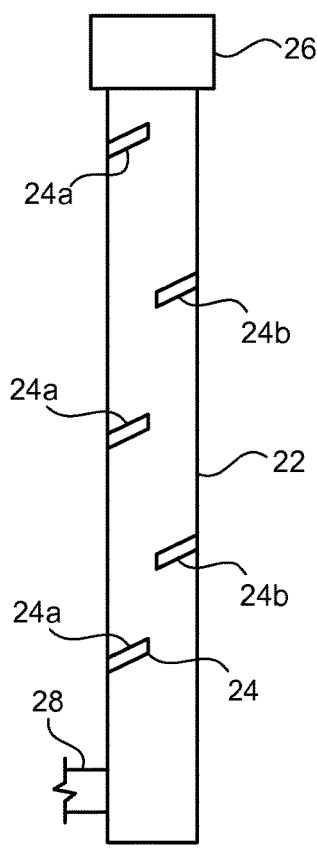
FIG. 3 is an isolated view showing the pipe as used in an early form of the apparatus of the present invention.

FIG. 3 illustrates the configuration of the pipe 22. It can be seen that the apertures 24 are formed through the wall thickness of the pipe 22. A closure 26 is located at the top of the pipe 22 so as to effectively close the top of the pipe. The connector 28 is located at the bottom of the pipe 22 so as to allow the introduction of water into the interior 40 of the pipe 22. Importantly, within the concept of the present invention, the connector 22 can be at any location along the length of the pipe 22.

In FIG. 3, it can be seen that each of the apertures 24 is in the nature of a slot. The apertures 24 are positioned in spaced parallel relationship to each other along the length of the pipe 22. A first set of apertures 24a will extend in one direction along a portion of the pipe 22 generally adjacent to the wall 16 of the container 12. A second set of apertures 24b are positioned on the pipe 22 away from the first set of apertures 24a. The second set of apertures 24b are directed further away from the wall of the container 16 than the apertures 24a. In the preferred embodiment of the present invention, there are a total of three apertures 24a. There are two apertures 24b. The apertures 24b are interposed longitudinally between the adjacent pairs of the apertures 24a. As such, this is configured to establish a broad fan-style of spray of water flow from the pipe 22. It can be seen that each of the first set of apertures 24a and the second set of apertures 24b are canted at an approximately 30° angle to horizontal. Once again, this angled relationship of each of the apertures 24a and 24b is configured so as to create the optimal cyclonic water flow path and pressure washing. This slotted type of aperture 24, as opposed the holes, or other types of openings, is intended to create a fan of water as it is ejected under pressure from each of the apertures 24. However, within the concept of the present invention, the apertures 24 can also include holes, openings, and similar techniques for releasing the water under pressure from the pipe 22. Additionally, spray-type fittings could be placed within the holes formed in the pipe 22. It is believed that the fan-shape flow of water greatly facilitates the pressure washing of the meat that enhances the creation of the cyclonic path of the water flow. Additionally, such a fan-type of spray further serves to distribute the pressurized water over a greater area than would be the release of water through the use of a simple circular hole pattern.

Figure 4:
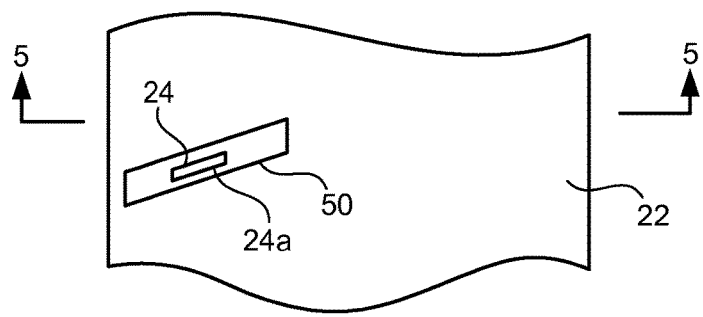
FIG. 4 is a close-up view showing the slot as formed in the pipe of an early form of the apparatus of the present invention.

FIG. 4 illustrates the construction of a single aperture 24, and in particular, aperture 24a as located within the slot 50. In experiments with the present invention, it was found that the apertures 24 can be made in a rapid, efficient and effective manner by simply using a saw set to cut the PVC pipe 22. The saw can be set so as to cut the slot 50 to a prescribed depth. Since the pipe 22 has a known wall thickness, the slot 50 is cut through the wall thickness so as to expose the aperture 24. The aperture 24 is exposed so as to have a greater length than a width. As can be seen, the aperture 24 is of an elongated nature. As such, this will cause a fan-type spray pattern. Additionally, the inner walls the slot 50 will also constrain the release of water into such a fan-type pattern and also, through fluid dynamics, enhance the force of the water as it is emitted through the aperture 24.

FIG. 4 further shows that the slot 50 has been cut so as to be canted at approximately a 30° angle with respect to horizontal. Once again, this angling of the aperture 24 and the slot 50 further enhances the wide-area spray-type flow pattern. Aperture 24b will have a similar configuration to aperture 24a.

Figure 5:
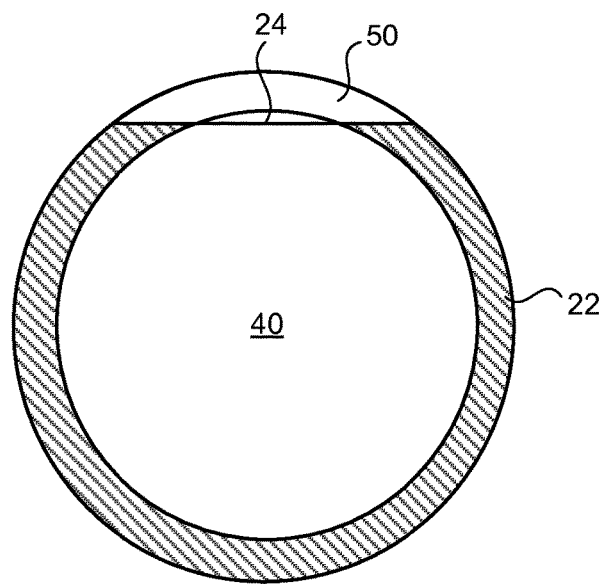
FIG. 5 is a cross-sectional view showing the slot as formed through the wall thickness of the pipe of an early form of the apparatus of the present invention.

FIG. 5 illustrates the construction of the slot 50 and the aperture 24 in a view taken across lines 5-5 of FIG. 4. As can be seen, the slot 50 is simply formed by cutting through the pipe 22 with a chop saw. As such, a relatively linear aperture 24 is formed when the depth of the cut enters the interior 40 of the pipe 22. As a result, water can be released through the aperture 24 and restrained and directed by the wall created by the formation of the slot 50.

Figure 6:
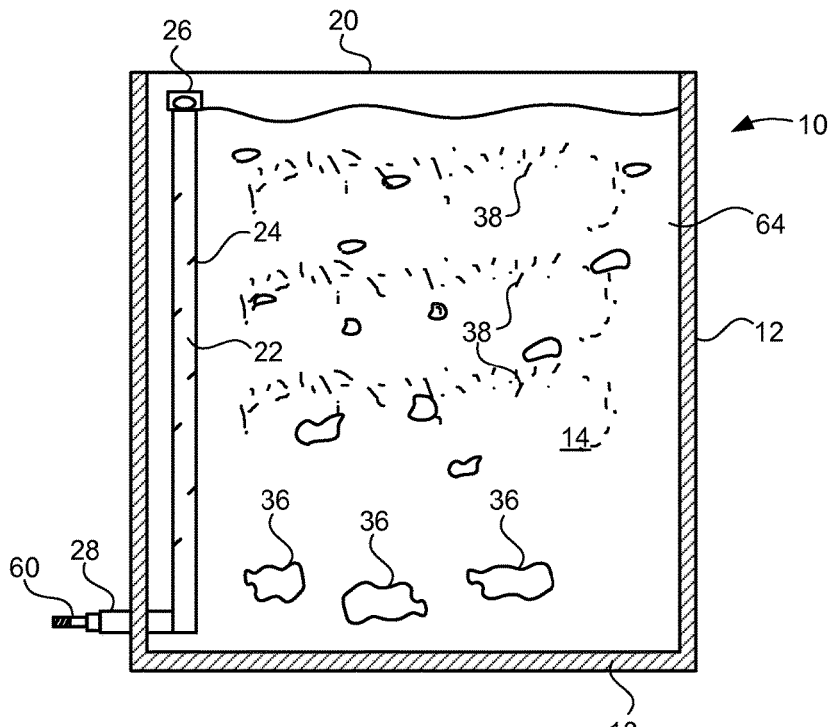
FIG. 6 is a cross-sectional view of an early form of the apparatus the present invention showing an intermediate step in an early form of the method of the present invention.

FIG. 6 shows an intermediate step in the method of the early form of the present invention. In FIG. 6, the apparatus 10 includes the container 12 and the pipe 22 in the manner described herein previously. A garden hose 60 is connected to the connector 28. As such, the water hose 60 can deliver water under pressure through the connector 28 and into the interior of the pipe 22. In FIG. 6, it can be seen that the pipe 22 has a closure 26 at an upper end thereof. Ultimately, the upper end of the pipe 22 should be disposed below the upper edge 20 of the container 12. When the cyclonic water path is created in the manner described herein previously, the extension of the pipe 22 above the upper edge 12 would restrict the dispersion of the debris and the release of the debris. In other words, the cyclonic path of the flow of the debris would encounter the upper end of the pipe 22 and tend to clump and gather in such an area. As such, within the concept of the present invention, the upper end of the pipe 22 should be disposed a certain distance below the upper edge 20 of the container 12.

In FIG. 6, it can be seen that water has been introduced through the apertures 24 of the pipe 22 into the interior 14 of the container 12. The introduction of the water in the cyclonic flow path illustrated in FIG. 2 causes the meat 36 to generally tumble in the area adjacent to the base 18 of container 12. The fan-type flow of water from the pipe 22 will serve to pressure-wash the tumbling meat or produce 36. Additionally, the debris 38, in the nature of feathers and blood, will tend to move upwardly toward the upper edge 20 of the container 10. This is because the debris 38 is generally less dense than water and less dense than the meat 36. The cyclonic flow of water within the container 12 also serves to urge the debris 38 upwardly. When the debris 38 is in the nature of blood, the continual flow of water into the interior 14 of the container 12 will continually dilute the blood within the container. The blood will mix with the water and be discharged in the manner shown in FIG. 7.

Figure 7:
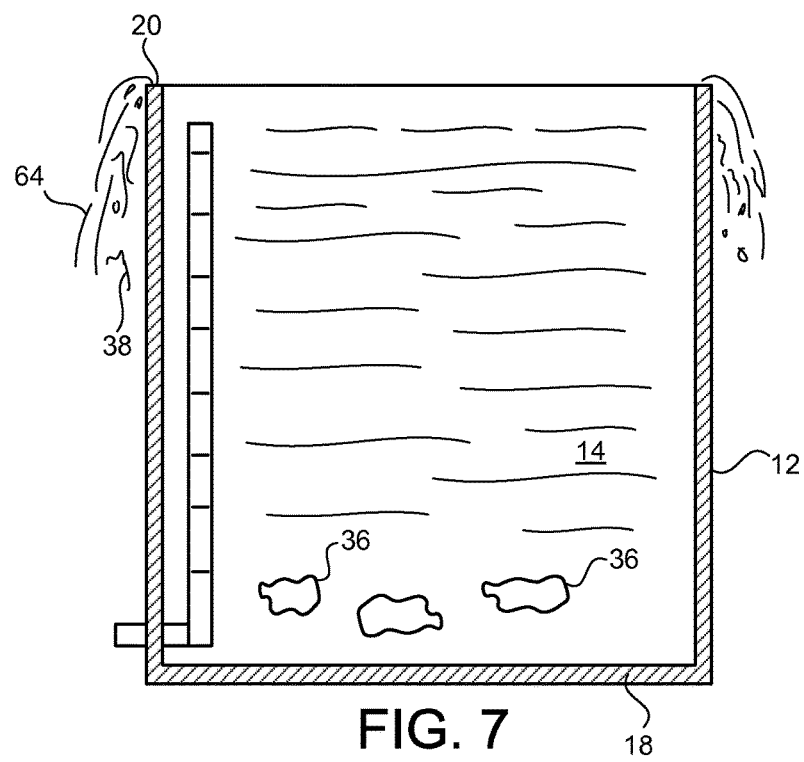
FIG. 7 is a cross-sectional view of an early form of the apparatus the present invention showing a later step in an early form of the method of the present invention.

In FIG. 7, it can be seen that after a certain amount of time, the meat or produce 36 will reside adjacent to the base 18 of the container 12. The water 64 from the interior 14 of the container 12 overflows the upper edge 20 of the container 12. This overflow will serve to discharge the debris 38 outwardly of the container 12. Ultimately, after a period of time, the blood will continue to dilute until only clear water resides within the interior 14 of the container 12. After the debris 38 has been discharged over the upper edge 20 of the container 12, and after the blood has become sufficiently dilute, the water flow can be turned off and the meat 36 removed from the interior 14 of container 12. The meat will be very clean and suitable for use without further treatment. As such, the system of the present invention avoids the requirement for meticulously washing the breast after it is harvested from the bird or meticulously washing the meat of the fish. It is believed that the process of the present invention can effectively wash the meat 36 in a short period of time.

Figure 8:
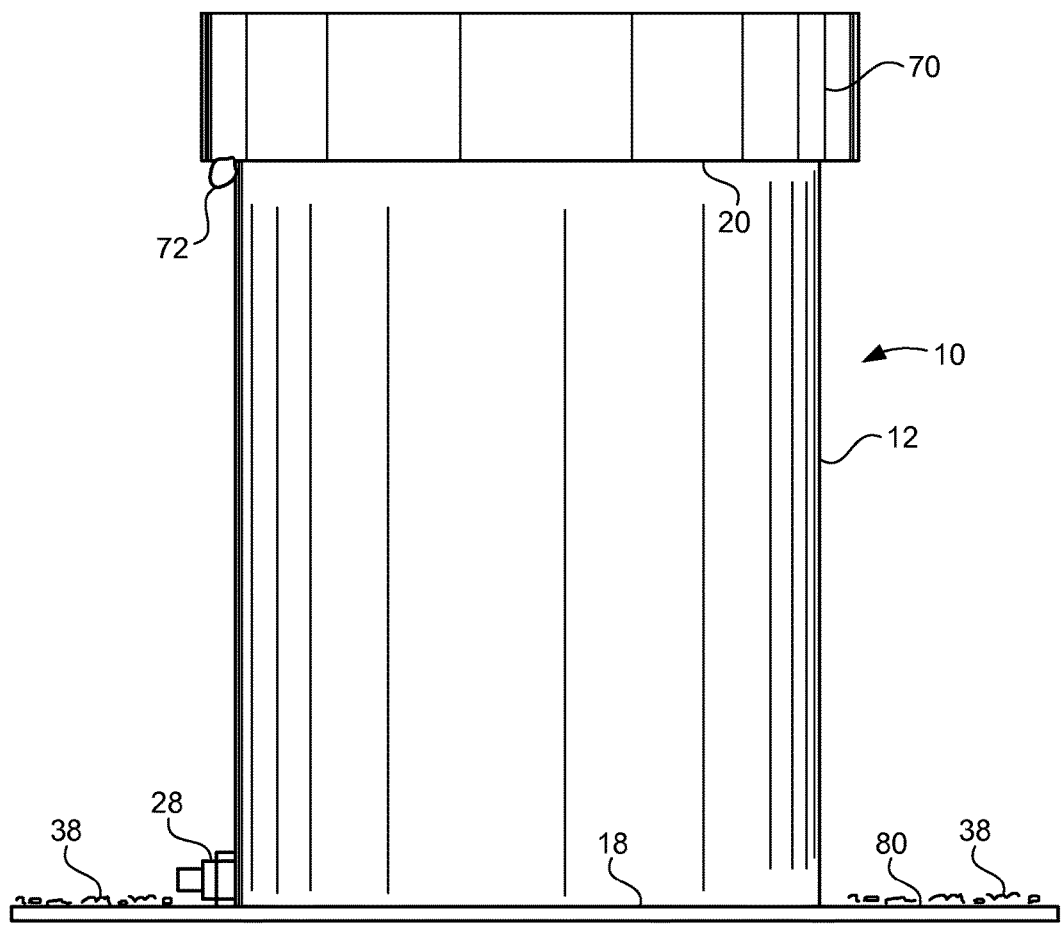
FIG. 8 is a side elevational view of an early form of the apparatus of the present invention and showing, in particular, a screen and a seat associated with the container.

FIG. 8 shows the exterior view of the container 12 of the apparatus 10 of the present invention. In FIG. 8, it can be seen that the container 12 has a generally cylindrical construction. The connector 28 is illustrated as located adjacent to the base 18 of the container 12. Importantly, a seat 70 can be placed onto the upper edge 20 of the container 12. The seat 70 can take any number of forms, as already known. In particular, a suitable insert can be applied into the interior of the container 12 such that the seat 12 can be pivotally connected by a hinge 72. As such, this construction allows the seat to be pivoted upwardly so as to allow access to the interior of the container 12. Alternatively, the seat 70 can simply be lifted from the container 12 so that the interior of the container 12 is exposed.

In FIG. 8, it can further be seen that there is a screen 80 that it is located adjacent to the base 18 of the container 12. The screen 80 extends outwardly of the exterior of the container 12. The screen 80 is provided so as to catch the debris 38 after it is washed from the interior 14 of the container 12. In certain circumstances, users do not desire to have feathers, and other debris, residing in an area adjacent to the apparatus 10. As such, the screen 80 is provided so as to collect the debris 38 thereon. As a result, the water will pass through the screen 80 while the debris 38 is collected on the top surface of the screen 80. Various manual techniques can then be employed so as to simply dispose of the debris 38 after it is collected on the top surface of the screen 80.

Figure 9:
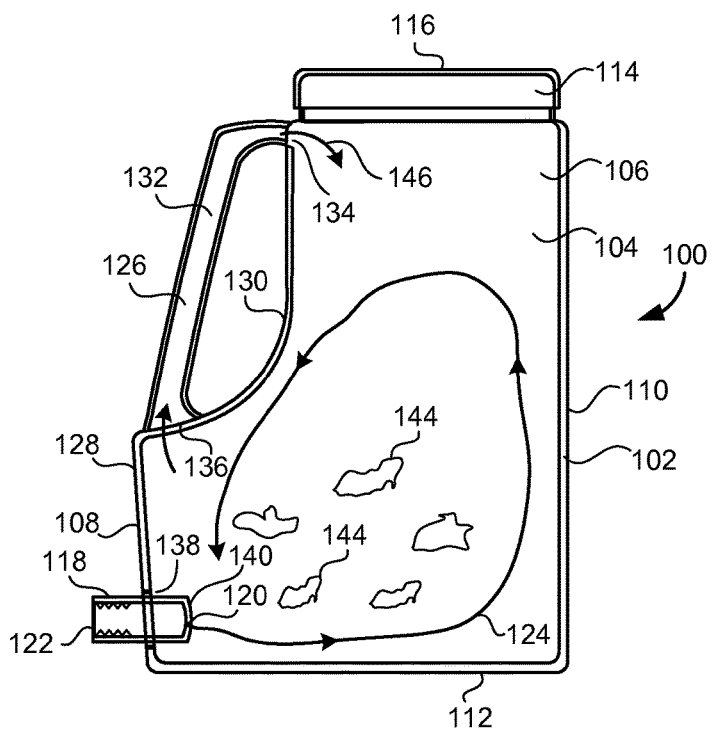
FIG. 9 is a cross-sectional side view of the preferred embodiment of the apparatus and method of the present invention.

Referring to FIG. 9, there is shown the apparatus 100 of the preferred embodiment as used for the cleaning of meat and/or produce. The apparatus 100 includes a container 102 having an interior volume 104 defined by a side wall 106, a pair of end walls 108 and 110, an opposite side wall (not illustrated in FIG. 9) and a base 112. The container has an opening 114 at an upper end thereof. In FIG. 9, it can be seen that there is a lid 116 that is threadedly affixed over the opening 114.

The apparatus 100 further includes a pipe 118 that has an outlet 120 that opens to the interior volume 104 of the container 102. The pipe 118 has an inlet 122 at an exterior of the container 102. The outlet 120 opens adjacent to the base 112 so as to direct a flow of fluid 124 through the pipe 118 and toward or adjacent to the base 112.

In FIG. 9, it can be seen that the end walls 108 and 110 extend upwardly in substantially parallel planar relationship to each other. There is a handle 126 that is formed on the end wall 108. The handle 126 can be integrally molded with the container 102 or can be affixed to the container 102. In particular, the end wall 108 includes a first portion 128 that extends in transverse relationship to the base 112 and a second portion 130 that extends upwardly and inwardly from the upper end of the first portion 128. The second portion 130 extends upwardly toward the opening 114 at the upper end of the container 102. The space between the handle 124 and a second portion 130 of the end wall 108 provides an area for the introduction of a hand such that the handle 126 can be properly gripped.

It can be seen that the handle 126 has an interior passageway 132 that has one end 134 that opens adjacent to the opening 114 of the container 102. The interior passageway 132 of the handle 126 has an opposite end 136 that opens to the interior volume 104 of the container 102 in a location above the pipe 118. It is important to note that the handle is not absolutely required in order to effectively wash the meat and/or produce. It is possible that each of the side walls can have a gripping indentation formed therein. This type of construction would facilitate the ability to blow-mold the container.

The pipe 118 extends through a hole 138 formed through the first portion 128 of the end wall 108. This hole 138 is formed in a location that is spaced above the base 112 of the container 102. Within the concept of the present invention, it is not critical that the pipe 118 be in a sealed fluid-tight relationship within the hole 138. Ultimately, the water introduced into the interior volume 104 of the container 102 will be discharged from the container. The outlet 120 of the pipe 118 is positioned in the interior volume 104 of the container 102 in spaced relation to the first portion 128 of the end wall 108. The inlet 122 of the pipe 118 extends outwardly of the container 102 in spaced relationship to the first portion 128 of the end wall 108.

Figure 11:
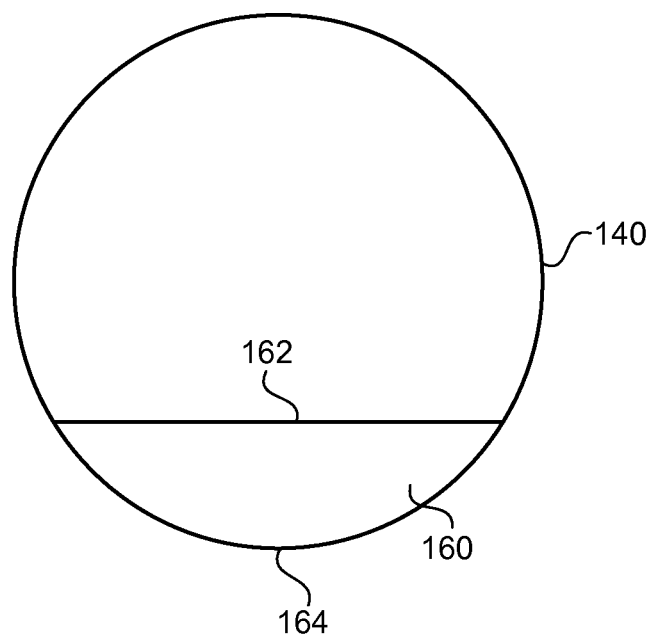
FIG. 11 is an end view of a nozzle or cover used in the pipe of the preferred embodiment of the present invention.

In the present invention, it can be seen that there is a cover 140 positioned at the outlet 120. The cover 140 will have an aperture (as shown in FIG. 11) so as to direct the flow of water toward or adjacent to the base 112 of the container 102. The inlet 122 of the pipe 118 is configured so as to have a hose connection therein. This hose connection is adapted to connect with a fluid-delivering hose, such as a garden hose.

As can be seen in FIG. 9, when a fluid, such as water, is introduced under pressure by the hose, the water will flow through the pipe 118 and be discharged through the outlet 102. It will then flow strongly outwardly of the pipe 118 so as to move in a direction adjacent to the base 112. Ultimately, as the fluid flow approaches the opposite end wall 110, it will be directed so as to flow generally upwardly. As the fluid flow rises upwardly, it will then circulate back downwardly so as to move along the inclined surfaces of the second portion 130 of the end wall 108 and back in a location generally adjacent to the outlet 120. This will cause the produce or meat 144 to rise from the base 102 and to circulate in a very turbulent manner upwardly and downwardly. This circular pattern of fluid flow 124 is in a circular pattern in a plane that is generally parallel to the planar side wall 106 and the opposite side wall. As such, this creates a strong tumbling action for the pieces of meat or produce. This strong turbulent action serves to separate the debris from the meat or produce. Ultimately, as the interior volume 104 begins to fill, the level of water within the container 102 will start to reach the opening 114 so as to be discharged outwardly therefrom. Before and during this process, the lid 116 is removed from the opening 114. As such, the water, along with the collected debris, is free to be discharged over the upper edge of the opening 114.

Experiments with the present invention have shown that the fluid flow is actually directed upwardly through the interior passageway 132 of the handle 126. As such, the flow will enter the lower opening 136 and be discharged out of the upper opening. When the water is discharged out of the upper opening, it is directed downwardly, as illustrated by arrow 146. This fluid flow further enhances and exacerbates the turbulent action of the circular pattern of fluid flow. Once again, the unique configuration of the handle 126 creates an unusual circulating flow pattern that serves to disrupt any sort of laminar flow of water within the container 102. This will also tend to create a downward force that will cause the meat or produce 104 to bounce upwardly and downwardly during the cleaning action.

Figure 10:
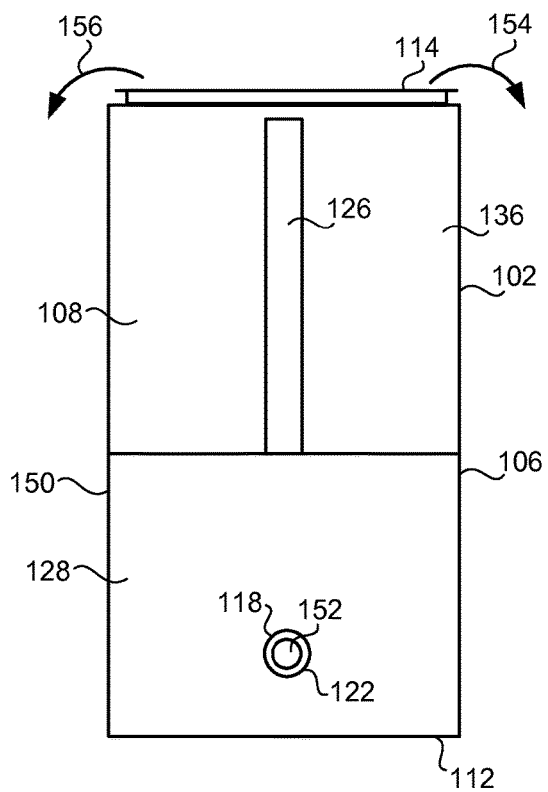
FIG. 10 is an end view of the apparatus of the preferred embodiment of the present invention.

FIG. 10 illustrates an end view of the container 102. In particular, end wall 108 is illustrated. End wall 108 includes the first portion 128 that extends vertically upwardly from the base 112. The second portion 130 of the end wall 108 will extend inwardly and upwardly from the first portion 128 toward the opening 114 at the top of the container 102. The handle 126 is illustrated as extending generally centrally between the sidewalls 106 and 150 of the container 102. The hose connection 152 is illustrated as located within the inlet 122 of the pipe 118. This is illustrated is located generally adjacent to the base 102. FIG. 10 further shows by arrows 154 and 156 that the water, along with the removed debris, is directed so as to overflow the upper edge of the opening 114.

FIG. 11 shows an end view of the cover 140 of the pipe 118. In particular, there is an aperture 160 that is formed across the bottom of the cover 140. Aperture 160 is defined by a chord cut 162 across cover 140. This somewhat half-moon configuration has been found to direct fluid forces in the most optimal manner. The smaller portion located at the bottom 164 of the aperture 160 is discharged with greater pressure than that flow that is adjacent to the chord cut 162. As a result, a type of "scooping" action is created so as to elevate the meat or produce from the base 112 of the container 102.

Figure 12:
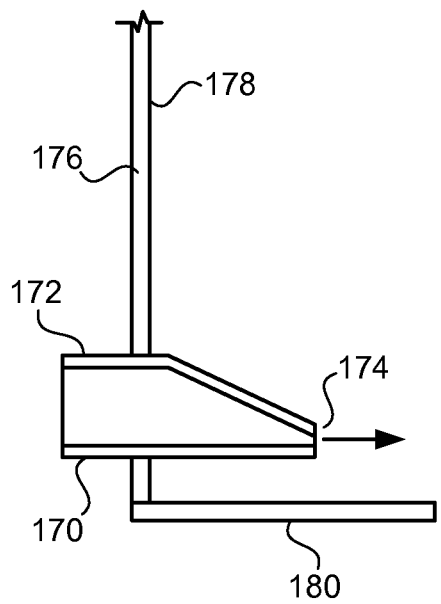
FIG. 12 is a cross-sectional view showing an alternative configuration of the nozzle of the present invention.

FIG. 12 shows an alternative form of the pipe 170 of the present invention. Pipe 170 has a hose-receiving inlet 172 and an outlet 174. The inlet is positioned exterior of the end wall 176 of the container 176. The outlet 174 is located on the interior of the container 178 in spaced relation to the end wall 176. The outlet 174 is illustrated as directly a flow of water toward or adjacent to the bottom 180 of container 178. The pipe 170 has walls that converge toward the outlet 174. As such, this will cause outlet 174 to act as a nozzle and so as to increase the velocity of the water emitted by the outlet 174.

In the present invention, is important to realize that a faucet or garden hose can deliver between twelve and thirteen gallons per minute. The optimal size of the container 102 is approximately one gallon. As such, the present invention can effectively flush the meat for produce within the interior of the container twelve to thirteen times in a minute. It is believed that an effective washing can be accomplished in thirty seconds through the use of the present invention. The strong pressurized forces of water delivered through the pipe to the interior of the container 102 serves to pressure wash the meat or produce prior to creating the tumbling action.

After the washing is complete, it is only necessary to pour the water from the interior volume 104 of the container 102 by turning the container 102 at an angle or upside down. The construction of the handle 126 easily allows for this manipulation. If necessary, a screen or other obstacle can be placed over the opening 114 so as to retain the meat or produce within the interior volume 104. Ultimately, the washed meat or produce will reside on the base 112 of the container 102.

The present invention is unique because of its small size. This small size of the container 102 facilitates the ability to place the container in an ice chest. As a result, after washing, the lid 116 can be placed over the opening 114 so as to retain the washed meat or produce within the interior of the container 102. The container 102 can then be placed into the ice chest so that the meat and/or produce remains somewhat cooled or refrigerated. The small size of the container 102 facilitates the ability to effectively store the container during times of non-use. In the preferred embodiment, the container 102 has approximately a one gallon capacity.

Within the concept of the present invention, the various walls of the container can be clear and/or painted. A screen or netting can be effectively applied over the exterior of the opening 114 so that the debris can be collected. This avoids any unsightly appearance of debris remaining in the area where the washing activities occurred.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for washing meat or produce, the apparatus comprising:
    a container having an interior volume defined by a wall and a base, said container having an opening at an upper end thereof;
    a pipe having an outlet opening to said interior volume of said container, said pipe having an inlet exterior of said container, said outlet of said pipe opening adjacent to said base such that a flow of fluid through said pipe is directed toward or adjacent to said base; and
    a handle affixed to or formed with said container on the wall of said container, said handle being hollow and having one end adjacent to the opening of said container and communicating with the interior volume of said container and having an opposite end positioned above said pipe and communicating with the interior volume of said container, the flow of fluid directed by said pipe flowing into the opposite end of said handle, through said handle and outwardly of the one end of said handle.

2. The apparatus of claim 1, further comprising:
    a lid removably affixed over said opening at an upper end of said container.

3. The apparatus of claim 1, said inlet of said pipe having a hose connection therein, said hose connection adapted to connect with a fluid-delivering hose.

4. The apparatus of claim 1, said interior volume of said container being approximately one gallon.

5. The apparatus of claim 1, said container having a generally rectangular cross-section.

6. An apparatus for washing meat or produce, the apparatus comprising:
    a container having an interior volume defined by a pair of side walls and a pair of end walls extending upwardly from said base so as to define said interior volume of said container, an upper area of one of said pair of end walls being inclined in a direction toward another of said pair of end walls; and
    a pipe having an outlet opening to said interior volume of said container, said pipe having an inlet exterior of said container, said outlet of said pipe opening adjacent to said base such that a flow of fluid through said pipe is directed toward or adjacent to said base.

7. The apparatus of claim 6, said one of said end walls having a first portion extending upwardly in transverse relation to said base and a second portion extending upwardly and inwardly from an upper end of said first portion, said second portion extending upwardly toward said opening of said container.

8. The apparatus of claim 6, said pipe extending through a hole formed in one of said end walls in a location spaced above said base of said container.

9. An apparatus for washing meat or produce, the apparatus comprising:
- a container having an interior volume defined by a wall and a base, said container having an opening at an upper end thereof;
- a pipe having an outlet opening to said interior volume of said container, said pipe having an inlet exterior of said container, said outlet of said pipe opening adjacent to said base such that a flow of fluid through said pipe is directed toward or adjacent to said base, said outlet of said pipe extending so as to be positioned in said interior volume of said container in spaced relation to the wall, said inlet of said pipe extending outwardly of said container in spaced relation to the wall, said outlet of said pipe having a cover therein or thereover, said cover having an aperture configured so as to direct the flow of fluid toward or adjacent to said base of said container , said cover having a circular shape, said aperture defined by a chord extending across said circular shape.

* * * * *